United States Patent
Ekanayake et al.

(10) Patent No.: US 9,644,484 B2
(45) Date of Patent: May 9, 2017

(54) SYSTEM AND METHOD FOR PROVIDING A FILM TREATMENT TO A SURFACE USING INLET BLEED HEAT MANIFOLD

(71) Applicant: General Electric Company, Schenectady, NY (US)

(72) Inventors: Sanji Ekanayake, Mableton, GA (US); Alston Ilford Scipio, Mableton, GA (US)

(73) Assignee: General Electric Company, Schenectady, NY (US)

( * ) Notice: Subject to any disclaimer, the term of this patent is extended or adjusted under 35 U.S.C. 154(b) by 7 days.

(21) Appl. No.: 14/485,072

(22) Filed: Sep. 12, 2014

(65) Prior Publication Data

US 2016/0076389 A1    Mar. 17, 2016

(51) Int. Cl.
| | | |
|---|---|---|
| *B05D 7/22* | (2006.01) | |
| *F01D 5/28* | (2006.01) | |
| *B05D 3/00* | (2006.01) | |
| *C23C 18/00* | (2006.01) | |
| *F02C 7/30* | (2006.01) | |

(52) U.S. Cl.
CPC ............ *F01D 5/288* (2013.01); *B05D 3/002* (2013.01); *C23C 18/00* (2013.01); *B05D 7/22* (2013.01); *F02C 7/30* (2013.01); *F05D 2220/32* (2013.01); *F05D 2230/90* (2013.01); *F05D 2260/95* (2013.01); *F05D 2270/11* (2013.01)

(58) Field of Classification Search
CPC .... F02C 7/30; F05D 2220/32; F05D 2230/90; F05D 2260/95; F05D 2270/11; B05D 3/002; B05D 5/08; B05D 7/22; F01D 5/288; B05C 5/00; B05C 11/10
USPC .......................................................... 427/299
See application file for complete search history.

(56) References Cited

U.S. PATENT DOCUMENTS

| | | | |
|---|---|---|---|
| 6,584,760 B1 * | 7/2003 | Lipinski | B01D 53/8625 165/4 |
| 6,659,715 B2 | 12/2003 | Kuesters et al. | |
| 8,197,613 B2 | 6/2012 | Kerber | |
| 8,268,134 B2 | 9/2012 | Goller et al. | |
| 2002/0141882 A1 | 10/2002 | Ingistov et al. | |
| 2004/0026261 A1 | 2/2004 | Stoffer et al. | |
| 2004/0175313 A1 * | 9/2004 | Foor | B01D 53/864 423/219 |

(Continued)

FOREIGN PATENT DOCUMENTS

EP          0674024 B1     12/1998

*Primary Examiner* — Kirsten Jolley
(74) *Attorney, Agent, or Firm* — Ernest G. Cusick; Frank A. Landgraff

(57) ABSTRACT

Disclosed herein are systems and methods for treating a surface, such as a gas turbine surface, with a filming agent using an inlet bleed heat manifold. A filming control system includes a storage tank configured to contain a filming agent; an inlet bleed heat manifold; and a supply conduit coupled to the storage tank on a first end and the inlet bleed heat manifold on a second end; wherein the filming control system is configured to deliver the filming agent from the storage tank and to discharge the filming agent through the inlet heat bleed manifold and the filming agent includes siloxane, fluorosilane, mercapto silane, amino silane, tetraethyl orthosilicate, succinic anhydride silane, or a combination including at least one of the foregoing.

12 Claims, 6 Drawing Sheets

(56) References Cited

U.S. PATENT DOCUMENTS

| | | | |
|---|---|---|---|
| 2008/0096045 A1* | 4/2008 | Fairbourn | C23C 18/04 428/641 |
| 2008/0149141 A1* | 6/2008 | Sales | F01D 25/002 134/22.1 |
| 2009/0158739 A1 | 6/2009 | Messmer | |
| 2012/0251742 A1 | 10/2012 | Kerber | |

* cited by examiner

SYSTEM AND METHOD FOR PROVIDING A FILM TREATMENT TO A SURFACE USING INLET BLEED HEAT MANIFOLD

BACKGROUND OF THE INVENTION

A turbomachine such as a gas turbine typically includes a compressor, combustor, and turbine. The compressor increases the pressure of gases, typically air, and the compressed gas is mixed with gas fuel by the combustor and burned, resulting in hot gases. The heated gases are used to drive a turbine which generates power.

Gas turbines operate in diverse environments and a variety of climates. An inlet bleed heat manifold uses discharge air from the compressor to regulate temperature and humidity to protect gas turbine components from icing and remove formed ice. Inlet bleed heat is also used to control the amount of air being introduced into the gas turbine under different load conditions. Inlet bleed heat is also used in conjunction with other techniques such as inlet guide vane modulation in order to protect the compressor from excessive aero-mechanical stresses.

Gas turbine components are cleaned to maintain performance and to extend the overall lifetime of the component, e.g., by reducing the degradation of gas turbine components due to foulants. Gas turbine components may be cleaned while the gas turbine is not in operation. This cleaning, referred to as offline cleaning, may be performed manually. An example of manual cleaning is crank washing. Crank washing is generally performed by the introduction of a cleaning solution into a turbine while slow cranking takes place. This cranking occurs without ignition or fuel being introduced. Since the gas turbine is not in operation while crank washing is performed, the productivity of the gas turbine is reduced. Cleaning of gas turbine components while the gas turbine is online can be done as well. Such methods often involve the use of additional equipment and/or manual cleaning.

These cleaning methods are employed to remove foulants which have accumulated on gas turbine components. However, after cleaning, gas turbine components are again susceptible to damage during service due to the presence and accumulation of foulants.

Therefore, a need exists for a system and method for treating a turbomachine surface, such as the surface of a gas turbine, which imparts protection from foulants and damage related thereto, is performed manually or automatically while the gas turbine is online or offline, and/or which employs existing equipment of the gas turbine, thereby extending the period of time between repairs and/or maintenance intervals, extending the lifetime of the component and/or improving the productivity of the gas turbine.

BRIEF DESCRIPTION OF THE INVENTION

According to one aspect of the invention, a method comprises mixing a filming agent with a liquid to form a filming solution, wherein the filming agent comprises siloxane, fluorosilane, mercapto silane, amino silane, tetraethyl orthosilicate, succinic anhydride silane, or a combination comprising at least one of the foregoing, and dispensing the filming solution onto a surface using an inlet bleed heat manifold.

According to another aspect of the invention, a system comprises a processor and a system memory communicatively coupled to the processor, the system memory having stored thereon executable instructions that when executed by the processor cause the processor to perform operations comprising receiving data from a sensor and providing instructions to dispense a filming agent onto a surface using an inlet bleed heat manifold based on the data received from the sensor, wherein the filming agent comprises siloxane, fluorosilane, mercapto silane, amino silane, tetraethyl orthosilicate, succinic anhydride silane, or a combination comprising at least one of the foregoing.

According to another aspect of the invention, a filming control system comprises a storage tank configured to contain a filming agent, an inlet bleed heat manifold, and a supply conduit coupled to the storage tank on a first end and the inlet bleed heat manifold on a second end, wherein the filming control system is configured to deliver the filming agent from the storage tank and to discharge the filming agent through the inlet bleed heat manifold and the filming agent comprises siloxane, fluorosilane, mercapto silane, amino silane, tetraethyl orthosilicate, succinic anhydride silane, or a combination comprising at least one of the foregoing.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Disclosed herein are methods and systems for the application of a film treatment using an inlet bleed heat manifold. The resultant film treatment imparts fouling resistant properties to protect a surface, such as a surface of turbomachine, compressor or gas turbine components, prior to being exposed to foulants during operation in service ("pre-fouling"). In an embodiment, the film treatment also imparts fouling resistance to protect a surface, such as the surface of gas turbine components, during operation in service ("post-fouling"). As described in further detail below, the film treatment comprises one or more filming agents. The filming agent comprises siloxane, fluorosilane, mercapto silane, amino silane, tetraethyl orthosilicate, succinic anhydride silane, or a combination comprising at least one of the foregoing.

Figure 1:
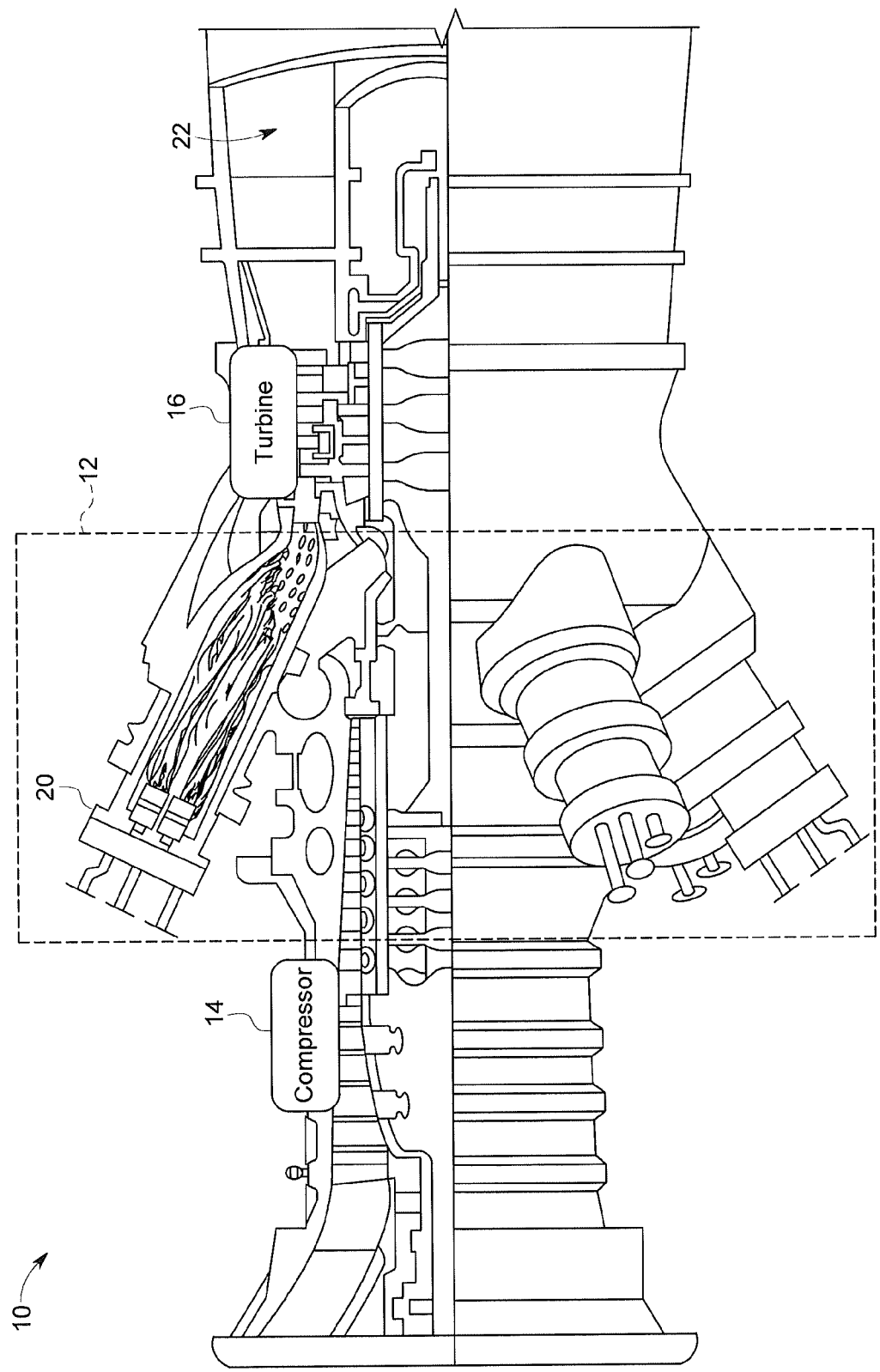
FIG. 1 is an exemplary illustration of a gas turbine.

FIG. 1 is an exemplary illustration of a gas turbine 10. Although embodiments described herein refer to a gas turbine as an exemplary surface, the system and methods described herein may be used to provide (or apply) a film treatment to any desired surface, including but not limited to turbomachines such as gas turbines. As shown in FIG. 1, gas turbine 10 has a combustion section 12 in a gas flow path between a compressor 14 and a turbine 16. The combustion section 12 includes an annular array of combustion components around the annulus. The combustion components include a combustion chamber 20, also known as a combustor, and attached fuel nozzles. The turbine is coupled to rotationally drive the compressor 14 and a power output drive shaft (not shown). Air enters the gas turbine 10 and passes through the compressor 14. High pressure air from the compressor 14 enters the combustion section 12 where it is mixed with fuel and burned. High energy combustion gases exit the combustion section 12 to power the turbine 16 which, in turn, drives the compressor 14 and the output power shaft. The combustion gases exit the turbine 16 through the exhaust duct 22.

Figure 2:
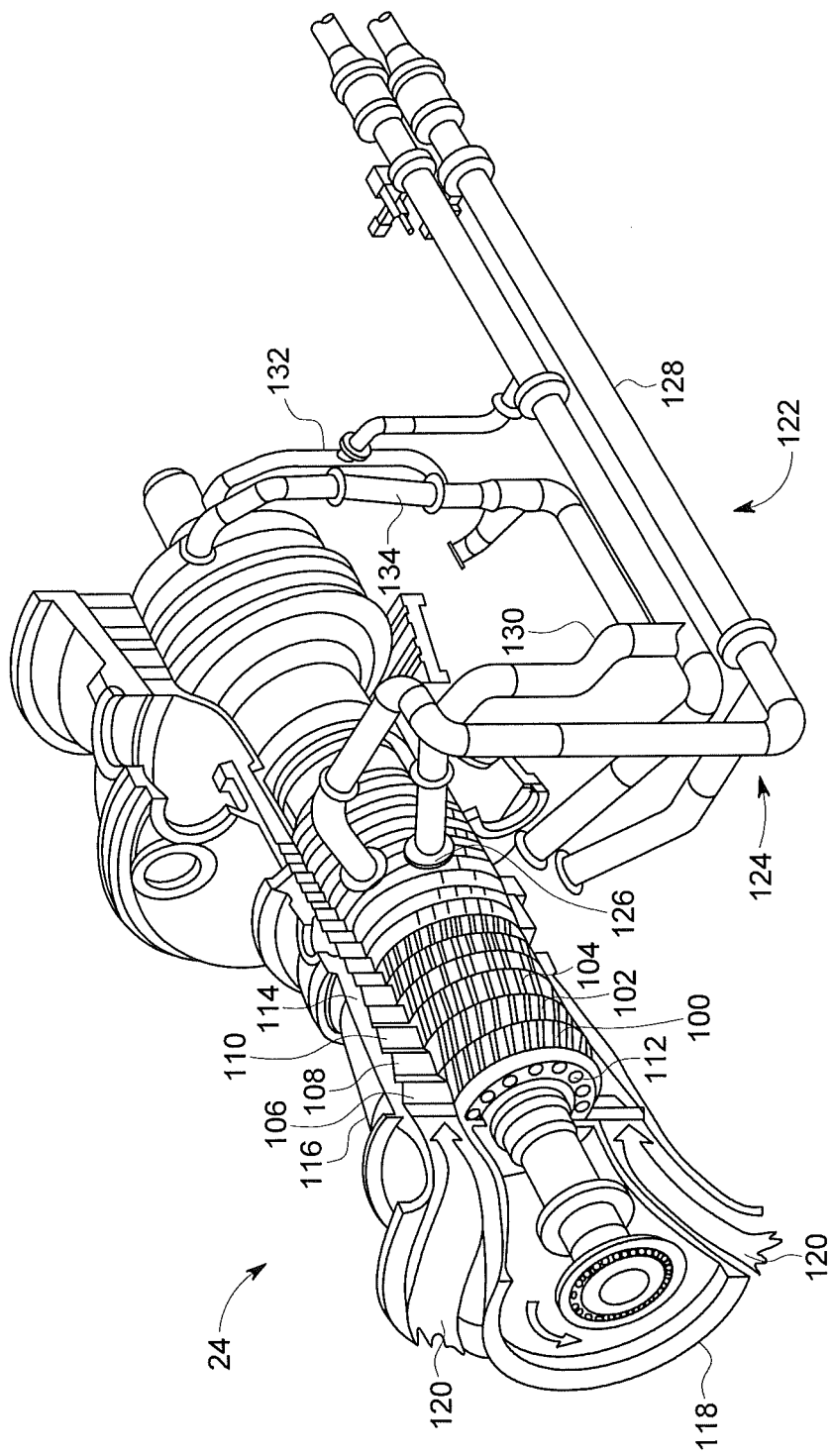
FIG. 2 is an exemplary illustration of a partial cross-section of a gas turbine compressor.

FIG. 2 is an exemplary illustration of a partial cross-section of a gas turbine compressor 24, which is used with the gas turbine 10 and the like. The compressor 24 includes one or more stages. As shown in FIG. 2, there may be an A-stage 100, a B-stage 102, or a C-stage 104. The terms "A-stage", "X-stage", and the like are used herein as opposed to "first stage", "second stage," and the like so as to prevent an inference that the systems and methods described herein are in any way limited to use with the actual first stage or the second stage of the compressor or the turbine. Any number of the stages may be used. Each stage includes a number of circumferentially arranged rotating blades, such as blade 106, blade 108, and blade 110. Any number of blades may be used. The blades are mounted onto a rotor wheel 112. The rotor wheel 112 is attached to the power output drive shaft for rotation therewith. Each stage optionally further includes a number of circumferentially arranged stationary vanes 114. Any number of vanes 114 may be used. The vanes 114 may be mounted within a casing 116. The casing 116 extends from a bellmouth 118 toward the turbine 16. The flow of air 120 thus enters the compressor 24 about the bellmouth 118 and is compressed through the blades, such as blade 106, 108, and 110, among others, and the vanes 114 of the stages before flowing to the combustion section 12.

The gas turbine 10 further comprises an air extraction system 122. The air extraction system 122 extracts a portion of the flow of air 120 in the compressor 24 for use in cooling the turbine and for other purposes. The air extraction system 122 includes one or more air extraction pipes 124. The air extraction pipes 124 extend from an extraction port 126 about one of the compressor stages towards one of the stages of the turbine. In this example, an X-stage extraction pipe 128 and a Y-stage extraction pipe 130 are shown. The X-stage extraction pipe 128 is positioned about an nth stage and the Y-stage extraction pipe 130 is positioned about the mth stage. Extractions from other stages of the compressor 24 may also be used. The X-stage extraction pipe 128 is in communication with an X-stage turbine pipe 132 while the Y-stage extraction pipe 130 is in communication with a Y-stage turbine pipe 134. The X-stage turbine pipe 128 corresponds to a particular stage of the turbine and the Y-stage turbine pipe 130 corresponds to a different stage of the turbine, for example. In another embodiment, the air extraction system 122 has quick-disconnect provisions. The quick-disconnect provisions are located on the air extraction pipes 124, and may be part of any or all of the individual extraction pipes, such as the Y-stage extraction pipe 130, for example. In an aspect of the embodiment, the quick-disconnect provisions directly connect to an extraction port 126.

Figure 3:
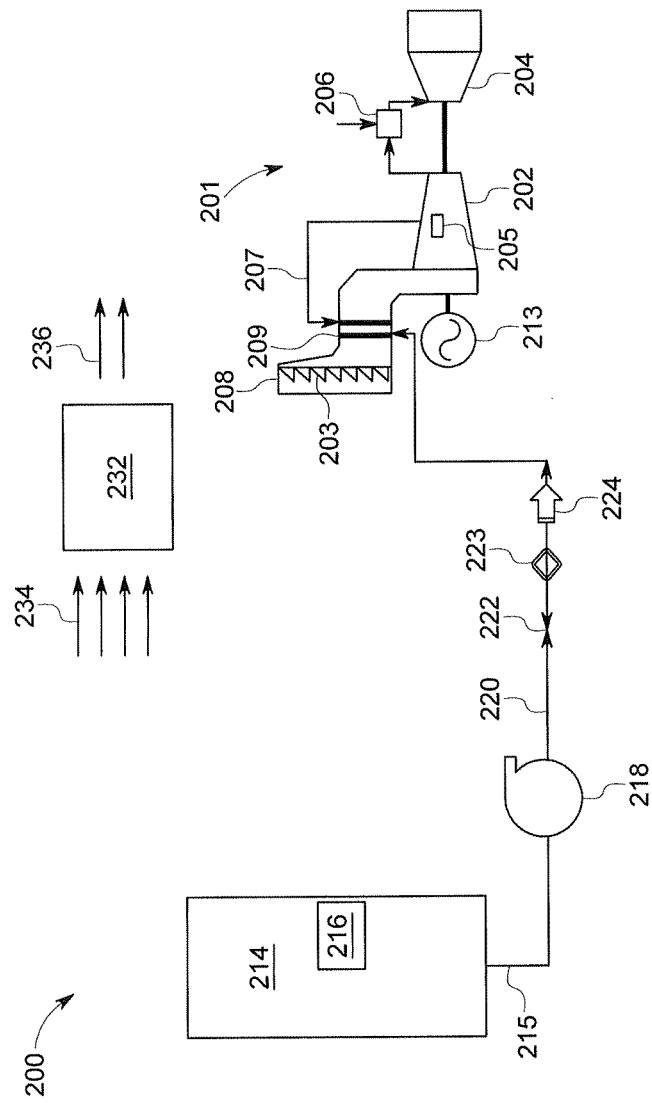
FIG. 3 is an exemplary illustration of a gas turbine film treatment system.

FIG. 3 is an exemplary schematic illustration of an embodiment of a gas turbine film treatment system 200 for use with a gas turbine 201. The gas turbine 201 includes a compressor 202, a combustor 206, a turbine 204, and an inlet air system 208. The gas turbine 201 is used to drive an electrical or mechanical load such as a generator 213. The compressor comprises a fouling sensor 205. The fouling sensor 205 is used to determine the concentration of foulant inside the gas turbine 201. The fouling sensor 205 determines the concentration of foulant on a particular surface of the gas turbine 201. The fouling sensor 205 transmits this concentration to the controller 232. The transmitted concentration can be compared against a threshold, which can be preselected. If the concentration of foulant detected by the fouling sensor 205 exceeds the threshold, a wash and film treatment and/or a film treatment is started, e.g., automatically. A wash and film treatment and/or a film treatment may also be performed according to a pre-selected time interval when the prior treatment is started manually.

The gas turbine film treatment system 200 includes a storage tank 214 that contains a filming agent. Multiple storage tanks for filming agents of different types or of one type may be used. In one embodiment, the filming agent comprises a silane. In another embodiment, the filming agent is a mixture of a first silane and a second silane, e.g., fluorosilane and mercapto silane. The first silane and the second silane are mixed at a predetermined ratio. In one aspect of the embodiment, the filming agent is a 1:1 mixture of fluorsilane and amino silane. The mixing may be done in advance or on-demand. In another embodiment, the filming agent is combined with an aqueous liquid such as deionized water. "Deionized water" is interchangeable with "demineralized water". The filming agent is mixed with the deionized water at a predetermined ratio. In an embodiment, the pH of the filming agent, the deionized water, or the mixture of the two may be adjusted. For example, this pH adjustment may be performed using acetic acid. In another embodiment, a non-ionic surfactant is added to the filming agent in order to improve water solubility. In yet another embodiment, the pH of the filming agent, the deionized water or a mixture comprising the two is adjusted to a pH from about 5 to about 9, specifically from about 5.5 to about 8.5, more specifically from about 6.5 to about 7.5.

The inlet bleed heat manifold 209 dispenses the filming agent or filming solution onto a gas turbine 201 surface or particular component or section of the gas turbine 201. The filming agent is dispensed as a fluid. For example, in one embodiment, the filming agent is heated such that it becomes steam. In another embodiment, the filming agent is dispensed as an aerosol. In yet another embodiment, the filming agent is dispensed as a liquid. In still another embodiment, the filming agent is mixed with water or another liquid to form a filming solution prior to being dispensed. In one aspect of the embodiment, the filming agent is mixed with deionized water at a predetermined ratio before being introduced to the inlet bleed heat manifold 209 where it is turned into steam and dispensed. The water used to form the filming solution is optionally treated to remove contaminants. This treatment includes processes such as reverse osmosis, advanced oxidation, ultraviolet radiation exposure, pulsed-power, and other water treatment processes.

The storage tank 214 is optionally provided with a level sensor 216 and is coupled through a conduit 215 to a supply pump 218. The supply pump 218 is connected to an inlet bleed heat manifold 209 through a filming agent flow modulating valve 222 disposed in filming agent conduit 220. The filming agent conduit 220 connects to the supply piping of the inlet bleed heat manifold 209. The inlet bleed heat manifold 209 receives air from the compressor 202 through supply piping 207. Supply piping 207 optionally comprises a valve or series of valves to control the flow of air from the compressor to the inlet bleed heat manifold 209. The supply piping 207 optionally connects to the exhaust section of the turbine 204. A temperature sensor is optionally disposed inside the supply piping 207.

The inlet bleed heat manifold 209 is disposed of inside or outside the inlet air system 208, and before or after, in terms of air flow, any air filters inside the inlet air system 208 and inlet guide vanes 203. Inlet guide vanes 203 may be used to modulate air flow 120 into the gas turbine 201. In one embodiment, the inlet guide vanes are used to modulate air flow 120 to the inlet bleed heat manifold 209. A pressure sensor 223 and a flow sensor 224 are disposed in the filming agent conduit 220 to provide data to control the flow of the filming agent to the inlet bleed heat manifold 209 or an online wash system 210. In an embodiment, the gas turbine filming treatment system 200 includes quick disconnect provisions in place of or in addition to the storage tank 214. The quick-disconnect provisions are incorporated into the filming agent flow modulating valve 222 and/or into the filming agent conduit 220. The quick-disconnect provision is used for external supply, such as from, for example, a supply truck.

The gas turbine film treatment system 200 may also include a controller 232. The controller 232 receives inputs 234 such as the level of fouling of the compressor 202, the level of the storage tank 214, the flow rate of the supply pump 218, the status of the supply pump 218, the flow rate of the filming agent to the compressor 202, the temperature of the compressor 202, the status of the filming agent flow modulating valve 222, the operating status of the gas turbine 201, the status of the inlet bleed heat manifold 209, and/or any other inputs relative to the status or operation of the gas turbine filming treatment system 200. In one aspect of the embodiment, the controller 232 determines the ratio of the filming agent to deionized water in the filming solution produced therefrom. For example, the controller 232 determines the amount of the filming agent to include or not include in the filming solution. In another aspect of the embodiment, the controller 232 determines the ratio of substances to mix to prepare the filming agent. The filming solution is mixed automatically at a predetermined ratio, which may be adjustable based on the type of filming agent, and injected into the inlet bleed heat manifold 209. A liquid for rinsing may also be injected into the inlet bleed heat manifold 209. In one embodiment, the liquid used for rinsing is deionized water. Inlet and drain values are optimally positioned and aligned prior to introduction of the filming agent or filming solution into the inlet bleed heat manifold 209. The mixing may be done in advance or at the time a demand is made. The controller 232 meters the amount of filming agent to be supplied to the inlet bleed heat manifold 209 based on how much water is available in a water supply available to the inlet bleed manifold 209 at that time or how much water will be used. The pH of the water from the inlet bleed heat manifold 209 may be adjusted. In one embodiment, acetic acid is mixed with the water from the inlet bleed heat manifold 209 to adjust the pH of the filming solution.

In an embodiment, the controller 232 provides outputs 236 such as instructions or control signals to the filming agent flow modulating valve 222, supply pump 218, gas turbine 201, inlet bleed heat manifold 209, and/or to any other component or system. The controller 232 is self-contained or, alternatively, is integrated into a larger control system. The controllers monitor various sensors and other instruments associated with a turbine system, such as gas turbine 201. In addition to controlling certain turbine functions, such as fuel flow rate, the controller 232 optionally generates data from its turbine sensors and presents that data for display to the turbine operator. The data may be displayed using software that generates data charts and other data presentations.

An example of the controller 232 is a computer system that includes microprocessors that execute programs to control the operation of the turbine system using sensor inputs, such as inputs 234, and instructions from human operators. The computer system includes logic units, such as sample and hold, summation and difference units that may be implemented in software or by hardwire logic circuits. The commands generated by the computer system processors cause actuators on the turbine system to, for example, adjust the fuel control system that supplies fuel to the combustion chamber, set the inlet guide vanes to the compressor, and adjust other control settings on the turbine system. The description of the computer system features and functionality is exemplary only and is non-limiting as to the disclosure.

The filming agent comprises a silane such as siloxane, fluorosilane, mercapto silane, tetraethyl orthosilicate (TEOS), amino silane, or a combination comprising at least one of the foregoing. Silanes, such as fluorosilane and siloxane, for example, are monomeric silicon chemicals. Silanes impart qualities such as hydrophobicity, abrasion resistance, temperature resistance, oleophobicity, and passivity, among others. It should be understood that the term "silane" is used to encompass the group of chemicals and not just a particular silane.

In one embodiment, the filming agent is a mixture of fluorosilane and mercapto silane. The mixing ratio of the fluorosilane and mercapto silane, or other combinations, may be predetermined. In one exemplary embodiment, fluorosilane and amino silane are mixed in equal parts. In another exemplary embodiment, fluorosilane and amino silane are mixed in equal parts for the filming agent. The mixing may be done in advance, on-demand, in real-time, or in a combination thereof. That is, the mixing is conducted prior to the time a film treatment is requested or planned, at a time a mixing is requested, during a film treatment, or in a combination thereof. Furthermore, a non-ionic surfactant may be added to the filming agent in order to improve water solubility.

In one embodiment, the controller 232 mixes fluorosilane and mercapto silane in equal parts to produce the filming agent. In an aspect of the embodiment, the controller 232 then mixes a metered amount of the filming agent with a metered amount of water of the inlet bleed heat manifold 209. In another embodiment, fluorosilane and mercapto silane are already mixed and stored in the storage tank 214. In yet another embodiment, a supply truck connects to the system using a quick-disconnect provision to provide a mixture of fluorosilane and amino silane as the filming agent. The water and the filming agent may be mixed in a predetermined ratio. The ratio may be adjusted based on the particular type of filming agent.

In an exemplary embodiment, gas turbine filming treatment system 200 is configured for film treating the gas turbine when the gas turbine is offline or online. A gas turbine is considered offline when the machine, such as a compressor or turbine section, is operating at significantly below normal operating temperature. For example, for an offline film treatment, the gas turbine may be cooled down, until the interior volume and surfaces have cooled down sufficiently, for example, to around 145° F., so that water or a filming or or cleaning solution being introduced into the gas turbine will not thermally shock the internal metal and induce creep, or induce any mechanical or structural deformation of the material.

Figure 4:
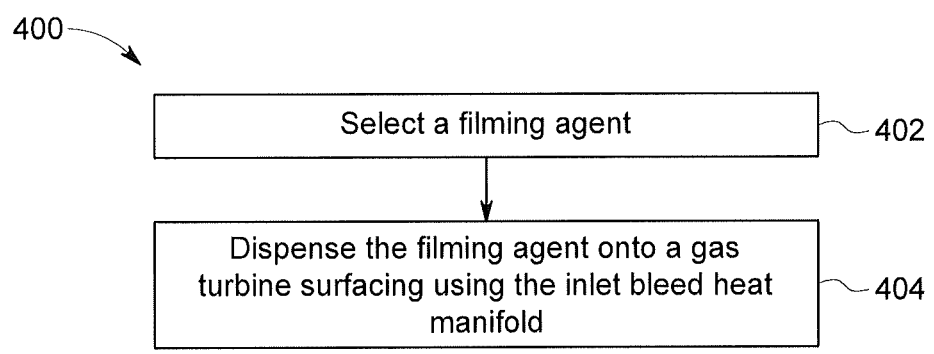
FIG. 4 illustrates a non-limiting, exemplary method of dispensing a film treatment using an inlet bleed heat manifold for a gas turbine.

Illustrated in FIG. 4 is a method 400.

At 402, a filming agent is selected. The filming agent may be selected by the controller 232, an operator, or automatically.

At 404, the filming agent is dispensed onto a gas turbine 201 surface using the inlet bleed heat manifold 209.

Figure 5:
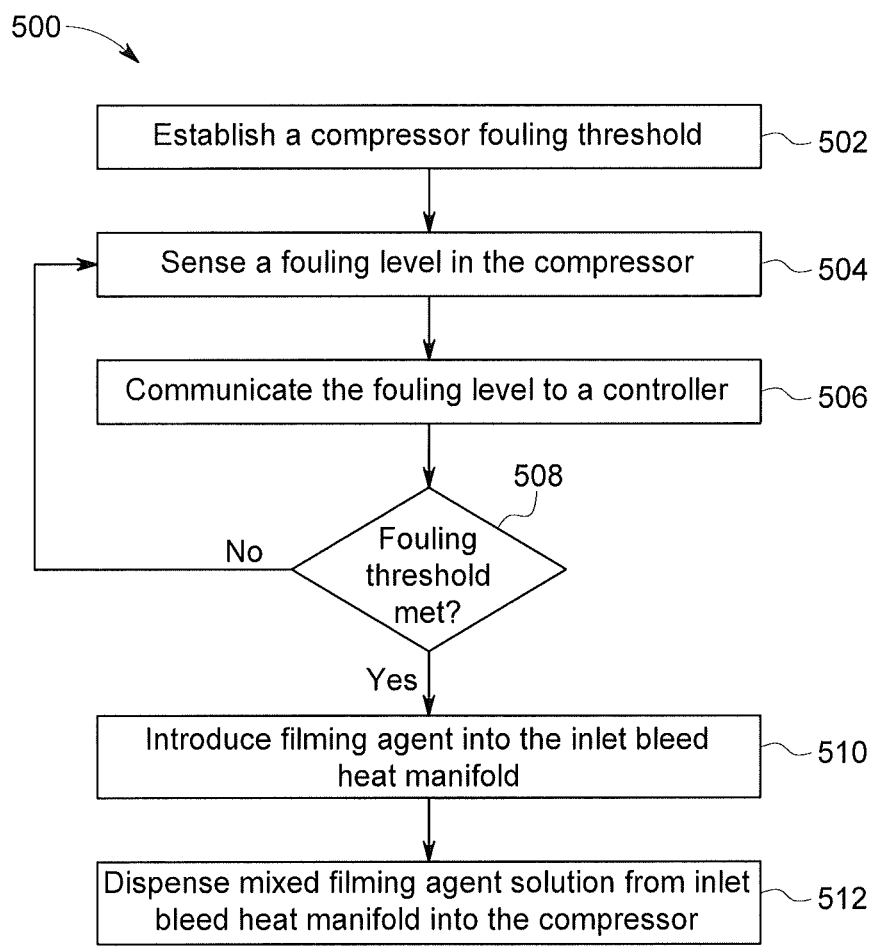
FIG. 5 illustrates a non-limiting, exemplary method of dispensing a film treatment using an inlet bleed heat manifold for a gas turbine.

Illustrated in FIG. 5 is a method 500. Each part of the sequence(s) described in regard to method 500 is labeled to denote a particular part of the method; however, the particular order of the parts of the method is not limited thereto. In an embodiment, the order in which the method is carried out is selected for the desired application.

At 502, a compressor 202 fouling threshold is established. The threshold level is an overall concentration of fouling or a concentration of a specific foulant or of one or more foulants. The fouling level is measured at one or more locations in the gas turbine 201 and one or more locations are used to establish the threshold level.

At 504, a fouling level in the compressor 202 is sensed.

At 506, the fouling level is communicated to the controller 232. The controller 232 may show this information on a display or send it to an operator.

At 508, the controller 232 determines whether the fouling threshold has been met.

At 510, a filming agent is introduced into inlet bleed heat manifold 209.

At 512, the filming solution is dispensed from the inlet bleed heat manifold 209 into the compressor 202. The filming agent may be dispensed as an aerosol, liquid, steam, or in another form.

Figure 6:
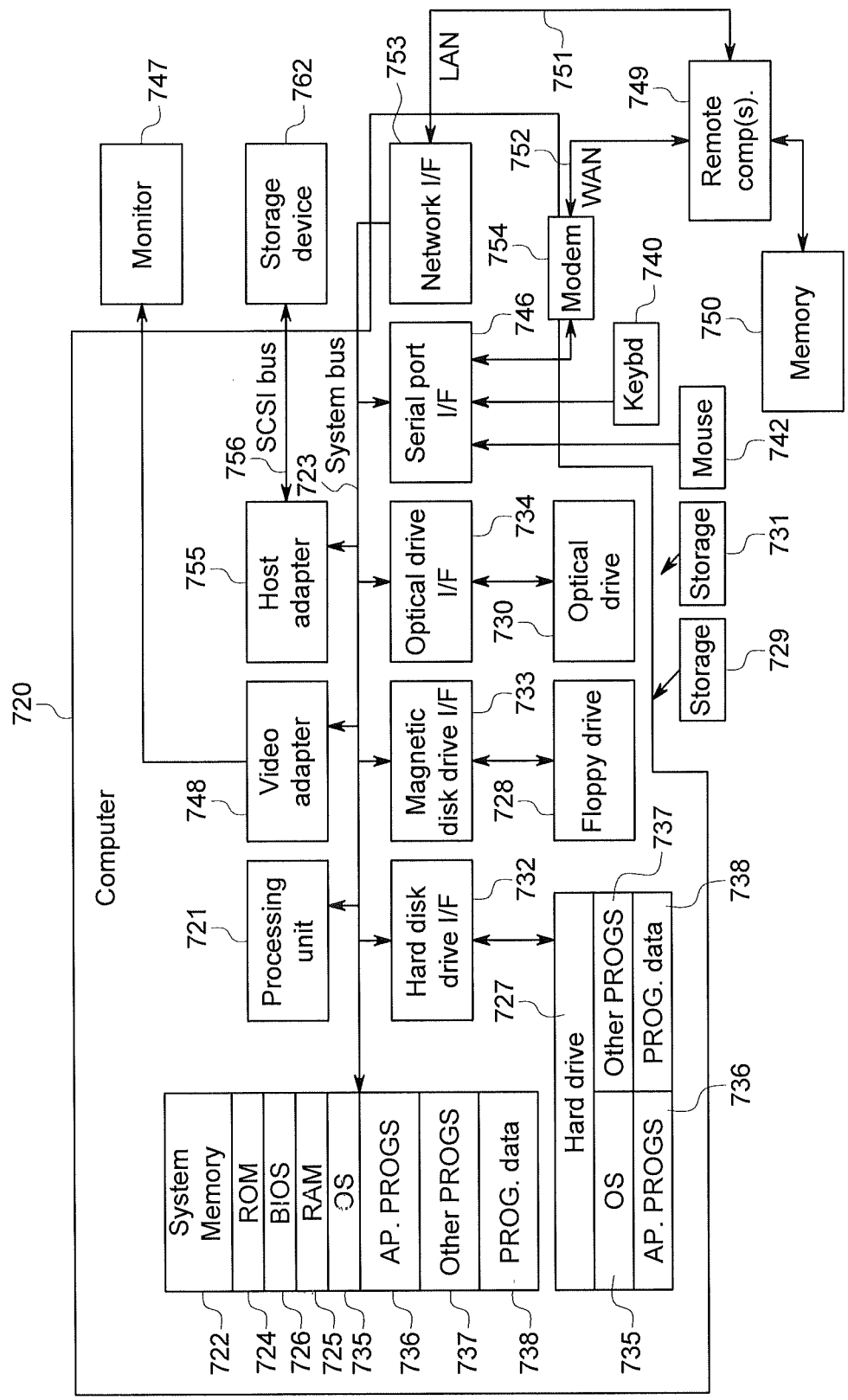
FIG. 6 is an exemplary block diagram representing a computer system in which aspects of the methods and systems disclosed herein or portions thereof are incorporated.

FIG. 6 is a block diagram representing a computer system in which aspects of the methods and systems disclosed herein and/or portions thereof may be incorporated. As shown, the exemplary general purpose computing system includes a computer 720 or the like, including a processing unit 721, a system memory 722, and a system bus 723 that couples various system components including the system memory 722 to the processing unit 721. The system bus 723 may be any of several types of bus structures including a memory bus or memory controller, a peripheral bus, and a local bus using any of a variety of bus architectures. The system memory 722 includes read-only memory (ROM) 724 and random access memory (RAM) 725. A basic input/output system 726 (BIOS), containing the basic routines that help to transfer information between elements within the computer 720, such as during start-up, is stored in ROM 724.

The computer 720 may further include a hard disk drive 727 for reading from and writing to a hard disk (not shown), a magnetic disk drive 728 for reading from or writing to a removable magnetic disk 729, and an optical disk drive 730 for reading from or writing to a removable optical disk 731 such as a CD-ROM or other optical media. The hard disk drive 727, magnetic disk drive 728, and optical disk drive 730 are connected to the system bus 723 by a hard disk drive interface 732, a magnetic disk drive interface 733, and an optical drive interface 734, respectively. The drives and their associated computer-readable media provide non-volatile storage of computer readable instructions, data structures, program modules and other data for the computer 720. As described herein, computer-readable media is a tangible, physical, and concrete article of manufacture and thus not a signal per se.

Although the exemplary environment described herein employs a hard disk, a removable magnetic disk 729, and a removable optical disk 731, it should be appreciated that other types of computer readable media which can store data that is accessible by a computer may also be used in the exemplary operating environment. Such other types of media include, but are not limited to, a magnetic cassette, a flash memory card, a digital video or versatile disk, a Bernoulli cartridge, a random access memory (RAM), a read-only memory (ROM), and the like.

A number of program modules may be stored on the hard disk, magnetic disk 729, optical disk 731, ROM 724 or RAM 725, including an operating system 735, one or more application programs 736, other program modules 737 and program data 738. A user may enter commands and information into the computer 720 through input devices such as a keyboard 740 and pointing device 742. Other input devices (not shown) may include a microphone, joystick, game pad, satellite disk, scanner, or the like. These and other input devices are often connected to the processing unit 721 through a serial port interface 746 that is coupled to the system bus 723, but may be connected by other interfaces, such as a parallel port, game port, or universal serial bus (USB). A monitor 747 or other type of display device is also connected to the system bus 723 via an interface, such as a video adapter 748. In addition to the monitor 747, a computer may include other peripheral output devices (not shown), such as speakers and printers. The exemplary system of FIG. 6 also includes a host adapter 755, a Small Computer System Interface (SCSI) bus 756, and an external storage device 762 connected to the SCSI bus 756.

The computer 720 may operate in a networked environment using logical connections to one or more remote computers, such as a remote computer 749. The remote computer 749 may be a personal computer, a server, a router, a network PC, a peer device or other common network node, and may include many or all of the elements described above relative to the computer 720, although only a memory storage device 750 has been illustrated in FIG. 6. The logical connections depicted in FIG. 6 include a local area network (LAN) 751 and a wide area network (WAN) 752. Such networking environments are commonplace in offices, enterprise-wide computer networks, intranets, and the Internet.

When used in a LAN networking environment, the computer 720 is connected to the LAN 751 through a network interface or adapter 753. When used in a WAN networking environment, the computer 720 may include a modem 754 or other means for establishing communications over the wide area network 752, such as the Internet. The modem 754, which may be internal or external, is connected to the system bus 723 via the serial port interface 746. In a networked environment, program modules depicted relative to the computer 720, or portions thereof, may be stored in the remote memory storage device. It will be appreciated that the network connections shown are exemplary and other means of establishing a communications link between the computers may be used.

Computer 720 may include a variety of computer readable storage media. Computer readable storage media can be any available media that can be accessed by computer 720 and includes both volatile and nonvolatile media, removable and non-removable media. By way of example, and not limitation, computer readable media may comprise computer storage media and communication media. Computer storage media include both volatile and nonvolatile media, removable and non-removable media implemented in any method or technology for storage of information such as computer readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 720. Combinations of any of the above should also be included within the scope of computer readable media that may be used to store source code for implementing the methods and systems described herein. Any combination of the features or elements disclosed herein may be used in one or more embodiments.

A technical effect of the embodiments described herein is to provide a system and method for providing a film treatment to a surface using an inlet bleed heat manifold, such as the surface of a turbomachine or more specifically a gas turbine, which imparts protection from foulants and damage related thereto, is performed manually or automatically while the gas turbine is online or offline, and/or which employs existing equipment of the gas turbine, thereby extending the period of time between repairs and/or maintenance intervals, extending the lifetime of the component and/or improving the productivity of the gas turbine.

The terminology used herein is for the purpose of describing particular embodiments only and is not intended to be limiting of the invention. Where the definition of terms departs from the commonly used meaning of the term, applicant intends to utilize the definitions provided herein, unless specifically indicated. The singular forms "a," "an," and "the" are intended to include the plural forms as well, unless the context clearly indicates otherwise. It will be understood that, although the terms first, second, etc. may be used to describe various elements, these elements should not be limited by these terms. These terms are only used to distinguish one element from another. The term "and/or" includes any, and all, combinations of one or more of the associated listed items. The phrases "coupled to" and "coupled with" contemplates direct or indirect coupling.

EXAMPLES

Example 1

Each of Samples 1-4 was prepared according to the ratios set forth in Table 1 to produce a filming agent. Each of the filming agents of Samples 1-4 was prepared by mixing the identified first silane and second silane in a 1:1 ratio. In addition, each of the Samples 1-4 was prepared according to an aqueous formulation or an organic solvent formulation. For the aqueous formulations, the pH of the distilled water was adjusted to 4.5-5.5 using acetic acid and then the silane mixture was added in with continuous stirring. A suitable amount of non-ionic surfactant was added in some samples as needed to enhance the solubility of the silane mixture in the distilled water. For the organic solvent formulations, the pH of a mixture of 95% ethanol and 5% distilled water was adjusted to 4.5-5.5 using an acetic acid and then the silane mixture was added in with continuous stirring.

TABLE 1

| Sample # | First Silane | Second Silane | Ratio of First Silane:Second Silane |
| --- | --- | --- | --- |
| 1 | Fluorosilane | Mercapto silane | 1:1 |
| 2 | Fluorosilane | Amino silane | 1:1 |
| 3 | Fluorosilane | TEOS | 1:1 |
| 4 | Fluorosilane | Succinic anhydride silane | 1:1 |

Example 2

Film treatments were applied to gas turbine components using the filming agents of Samples 1-4, respectively. The film-treated gas turbine components were preheated to 200° C. and soaked in a foulant blend for 30 minutes. After being dried overnight at 150° C., there was little or no foulant present on the gas turbine components.

Example 3

Sample 5 is an aqueous filming solution prepared by mixing a silane with deionized water at a concentration of 0.5-2.0% with continuous stirring. The pH was adjusted to 4.5-5.5 using acetic acid. In Sample 6, 0.1% of a non-ionic surfactant was added to improve the solubility of the silane in the deionized water.

Example 4

Film treatments were applied to gas turbine components using the filming solutions of Samples 5-6, respectively. The film-treated gas turbine components were preheated to 200° C. and soaked in a foulant blend for 30 minutes. After being dried overnight at 150° C., there was little or no foulant present on the gas turbine components.

The results of Examples 1-4 thus demonstrate that the gas turbine film treatment methods and systems described herein result in significantly reduced fouling of gas turbine components.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed:
1. A method comprising:
mixing a filming agent with a liquid to form a filming solution, wherein the filming agent comprises siloxane, fluorosilane, mercapto silane, amino silane, tetraethyl orthosilicate, succinic anhydride silane, or a combination comprising at least one of the foregoing; and dispensing the filming solution onto a gas turbine surface, where dispensing comprises dispensing the filming solution directly into an inlet bleed heat manifold of the gas turbine.

2. The method of claim 1, wherein the gas turbine surface is at least one of a casing, a vane, a blade, a rotor wheel, or a turbine.

3. The method of claim 1, wherein the liquid is deionized water.

4. The method of claim 3, further comprising adjusting a pH of the filming solution with acetic acid.

5. The method of claim 1, wherein a pH of the filming solution is from about 5 to about 9.

6. The method of claim 1, wherein the filming solution is dispensed as a liquid.

7. The method of claim 1, wherein the filming solution is dispensed as steam.

8. The method of claim 1, wherein the filming solution is dispensed as an aerosol.

9. The method of claim 1, wherein the filming agent includes a combination of at least two of siloxane, fluorosilane, mercapto silane, amino silane, tetraethyl orthosilicate, or succinic anhydride silane.

10. The method of claim 1, wherein the filming agent imparts one or more properties to the surface, the one or more properties comprising passivity, hydrophobicity, oleophobicity, anti-stick properties, or a combination comprising at least one of the foregoing.

11. The method of claim 1, wherein the filming solution is dispensed using a quick-disconnect provision in fluid communication with a gas turbine.

12. The method of claim 1, further comprising mixing a non-ionic surfactant with the filming agent.

* * * * *